United States Patent
Temmink

[19]

[11] Patent Number: 5,918,726
[45] Date of Patent: Jul. 6, 1999

[54] APPARATUS FOR TRANSFERRING SEPARATE PRODUCTS, SUCH AS EGGS AND FRUIT, FROM A FEED CONVEYOR TO A PACKAGING APPARATUS

[75] Inventor: Leonardus Johannes Temmink, Aalten, Netherlands

[73] Assignee: FPS Food Processing Systems B.V., Netherlands

[21] Appl. No.: 08/786,135

[22] Filed: Jan. 21, 1997

[30] Foreign Application Priority Data

Dec. 13, 1996 [NL] Netherlands .......................... 1004779

[51] Int. Cl.[6] .................................................. B65G 47/30
[52] U.S. Cl. ...................... 198/418.6; 198/432; 198/440; 198/445; 198/534; 198/370.03
[58] Field of Search .................. 198/370.03, 370.04, 198/370.05, 418.6, 432, 440, 458, 534, 836.3, 445; 209/510

[56] References Cited

U.S. PATENT DOCUMENTS

| | | | |
|---|---|---|---|
| 3,224,579 | 12/1965 | Scollard et al. ......................... | 209/514 |
| 4,049,111 | 9/1977 | Mosterd ................................... | 198/445 |
| 4,487,321 | 12/1984 | Bliss ........................................ | 209/510 |
| 4,776,465 | 10/1988 | McEvoy et al. . | |
| 5,086,909 | 2/1992 | Powell, Jr. .............................. | 198/534 |
| 5,101,954 | 4/1992 | Nambu ................................. | 198/370.04 |
| 5,160,019 | 11/1992 | Temming .............................. | 198/803.9 |
| 5,167,317 | 12/1992 | Van Der Schoot et al. ........ | 198/469.1 |
| 5,168,977 | 12/1992 | van Essen et al. . | |
| 5,232,080 | 8/1993 | Van Essen et al. .................. | 198/418.6 |

FOREIGN PATENT DOCUMENTS

| | | |
|---|---|---|
| 98733 | 1/1984 | European Pat. Off. . |
| 0 517 342 | 12/1992 | European Pat. Off. . |
| 0143112 | 6/1988 | Japan . |

*Primary Examiner*—Johnny D. Cherry
*Assistant Examiner*—Steven B. McAllister
*Attorney, Agent, or Firm*—Larson & Taylor

[57] ABSTRACT

An apparatus for transferring separate products, such as eggs and fruit, from a feed conveyor to a packaging apparatus includes a feed conveyor provided with at least one row of product holders, a receiving conveyor provided with brushes for receiving the products discharged from the feed conveyor and a feed-through conveyor connecting to the receiving conveyor for further conveying the products to a packaging apparatus. The apparatus is provided with electrically operable discharge members disposed above the feed conveyor. The fall trajectory of the articles discharged from the feed conveyor is such that the articles end up at substantially the same landing location on the receiving conveyor, independently of the speed of travel of the feed conveyor at the moment of discharge.

5 Claims, 6 Drawing Sheets

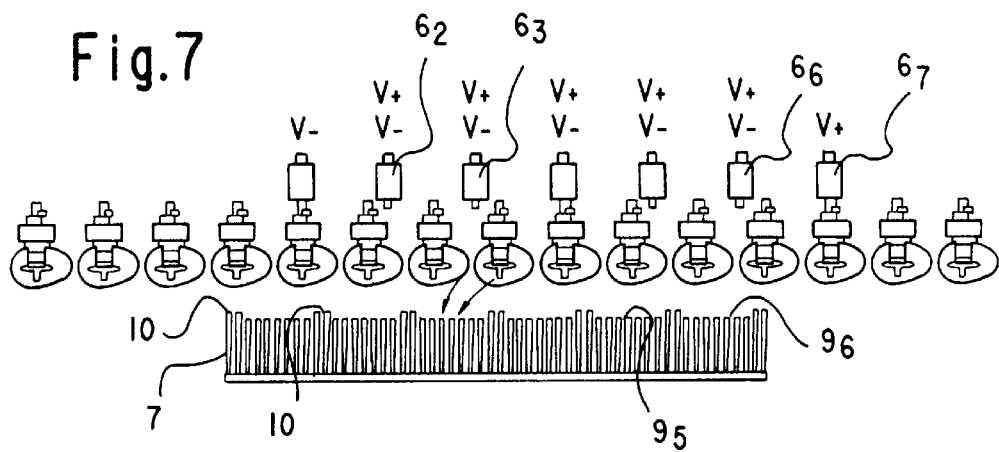
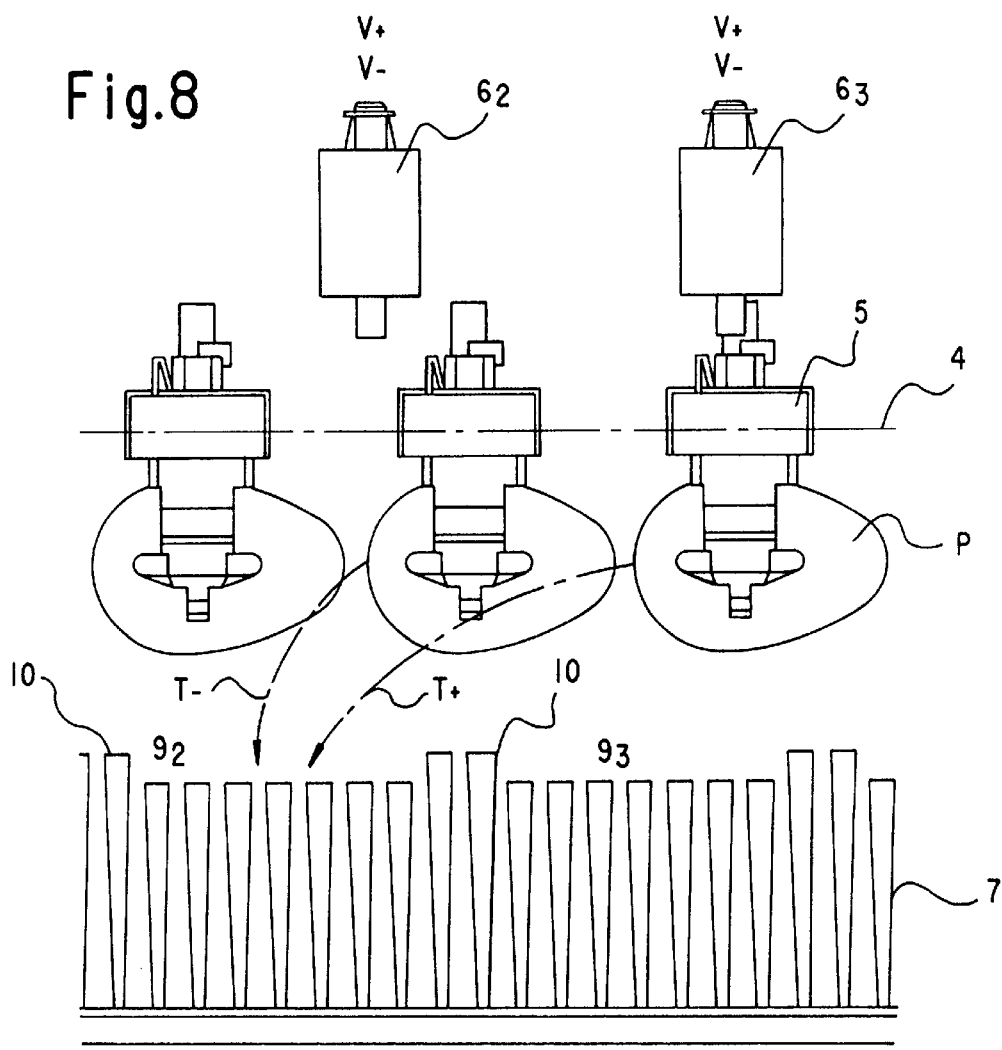

APPARATUS FOR TRANSFERRING SEPARATE PRODUCTS, SUCH AS EGGS AND FRUIT, FROM A FEED CONVEYOR TO A PACKAGING APPARATUS

FIELD OF THE INVENTION

The invention relates to an apparatus for transferring separate products, such as eggs and fruit, from a feed conveyor to a packaging apparatus, which apparatus comprises: a feed conveyor provided with a least one row of product holders, which product holders are spaced apart in the direction of movement of the feed conveyor; a receiving conveyor provided with brushes, for receiving the products discharged from the feed conveyor, which receiving conveyor is arranged under the feed conveyor and whose direction of movement is perpendicular to that of the feed conveyor; and a feed-through conveyor, connecting to the receiving conveyor, for further conveying the products to a packaging apparatus.

BACKGROUND OF THE INVENTION

Such an apparatus is known from U.S. Pat. No. 5,167,317 and usually forms part of a receiving station of a product-sorting apparatus. Connected to such a sorting apparatus are as many receiving stations as there are weight or quality classes wherein the products are to be sorted by the sorting apparatus.

Sorting apparatuses can be set at different operating speeds, depending on the desired treatment capacity. The products discharged from the main or feed conveyor of the sorting apparatus traverse a fall trajectory which depends on the speed of travel of this main conveyor. Also during the starting and stopping of the main conveyor, changes occur in the fall trajectory traversed by the discharged products. To enable the discharged products to be received at the same location, independently of the speed at the moment of discharge, the discharging moment of the products should be advanced when the speed of travel of the main conveyor increases, or postponed with its speed decreases. A solution to this problem is known from, inter alia, EP-B-0.098.733, which describes a container disposed above the main conveyor and containing electrically operable discharge members, which, when energized, provide for the discharge of a product from a product carrier of the main conveyor. Via a linearly slidable bar, the container with discharge members is displaceable in the direction of movement of the main conveyor, or opposite thereto, which slidable bar is driven by a driving mechanism directly coupled tot he drive motor for the main conveyor.

SUMMARY OF THE INVENTION

The object of the invention is to provide a simplified solution to the problem of the speed compensation during the dischage of products from the main conveyor, which solution makes it possible in particular to omit the driving mechanism, coupled to the drive motor of the main conveyor, for the slidable container with discharge members, and to eliminate the wiring moving along with that container with discharge members.

To that end, the invention provides an apparatus provided with electrically operable discharge members disposed above the feed conveyor, which discharge members are fixedly arranged, while, further, means are present for operating these discharge members, respectively for influencing the fall trajectory of the articles discharged from the feed conveyor. the arrangement being such that these articles end up on the receiving conveyor at substantially the same landing location, independently of the speed of travel of the feed conveyor at the moment of discharge.

In accordance with a preferably used embodiment of the apparatus according to the invention, the top face of the receiving conveyor is divided, by means of elastic ropes stretched at a short distance above that top face and extending in the direction of movement of the receiving conveyor, into parallel channels, while the number of discharge members of the feed conveyor per track is equal to that number of channels and each channel serves as landing location for products discharged from a fixed discharge member associated with that channel, which ropes form the means for influencing the fall trajectory of the articles discharged from the feed conveyor. These ropes provide that the fall trajectory of products discharged at low or high speeds is changed so that these products end up in a controlled manner in the channel of the receiving belt associated with the discharge member of that channel.

Instead of the fall trajectory of the eggs discharged, in accordance with another embodiment, the fixed discharge members can be controlled so that at a low speed, the discharge member of a channel of the receiving belt associated with that discharge member is energized, while at high speeds, the upstream discharge member associated with the preceding channel of the receiving belt is energized, so that the product discharged at high speed ends up in the proper channel of the receiving belt all the same. Instead of two speed-dependently operable discharge members per channel, it is also possible to use three or more speed-dependently operable discharge members per channel.

BRIEF DESCRIPTION OF THE DRAWINGS

Embodiments of the apparatus according to the invention are specified hereinafter with reference to the accompanying drawings, wherein:

FIGS. 5–7 are views according to FIGS. 1–3 of a second embodiment;

FIG. 8 is a detail of the view according to FIG. 7, shown to an enlarged scale;

DETAILED DESCRIPTION OF THE PREFERRED EMBODIMENTS OF THE INVENTION

Figure 1:
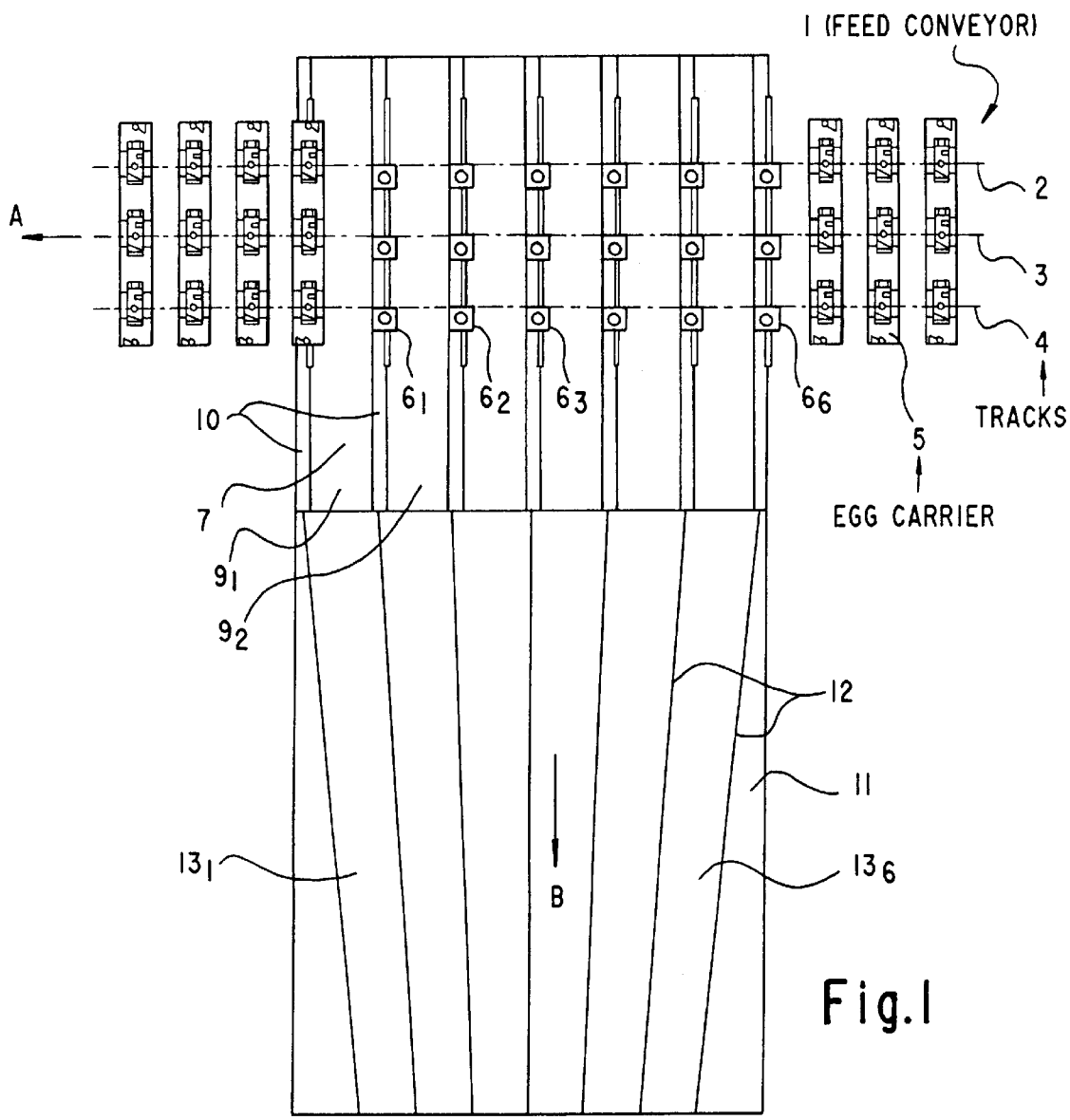
FIG. 1 is a top plan view of an apparatus according to the invention according to a first embodiment.

In FIG. 1, a main or feed conveyor 1 consisting of three separate, parallel tracks 2, 3 and 4 is shown in dotted lines. The tracks 2, 3 and 4 are each provided with product holders or egg carriers 5 respectively, spaced apart in the direction of movement A. The products or eggs P can be discharged from the egg carriers 5 by means of electrically operable discharge members 6 which are disposed above the feed conveyor 1 and which can be energized at the desired moment and open the egg carrier 5 at that moment, whereupon the egg P is discharged.

Disposed under the feed conveyor 1 is a receiving conveyor 7 whose direction of movement is indicated by arrow B. The receiving conveyor 7 is built up of brushes 7' whose brush hairs are perpendicular to the top face of the receiving conveyor 7. The top face of the receiving conveyor 7 is divided into channels 9 which extend in the direction of movement B and which are in parallel juxtaposition. The sidewalls of the channels 9 are formed by elastic ropes 15 stretched at a short distance above the top face of the receiving conveyor 7 (see FIG. 4), or by extended brush hairs 10 (see FIG. 8), or, optionally, by a combination of the two means 10, 15. The width of each channel 9 is somewhat greater than the greatest longitudinal dimension of the eggs P to be sorted. The hairs of 7' the brushes of the receiving conveyor 7 are provided on brush strips that are coupled together and connected to a series of parallel, endless chains 8' stretched over two chain wheels 8 and drivable by means of a driving shaft not shown.

Connecting to the receiving or brush conveyor 7 is a feed-through conveyor 11, which is movable in the same direction B and conveys the eggs taken over from the conveyor 7 to a packaging apparatus, not shown, disposed downstream of the feed-through conveyor 11. Provided above the top face of the feed-through conveyor 11 are a number of guide strips 12 whose ends proximal to the receiving conveyor 7 abut to the elastic ropes 15 or the raised brush edges 10 of the channels 9 of the receiving conveyor 7. Between each pair of guide strips 12 a channel 13 is located whose width decreases in the direction of movement B in order that the mutual pitch distance of the eggs can be adapted to the smaller pitch distance of the packaging apparatus.

Figure 4:
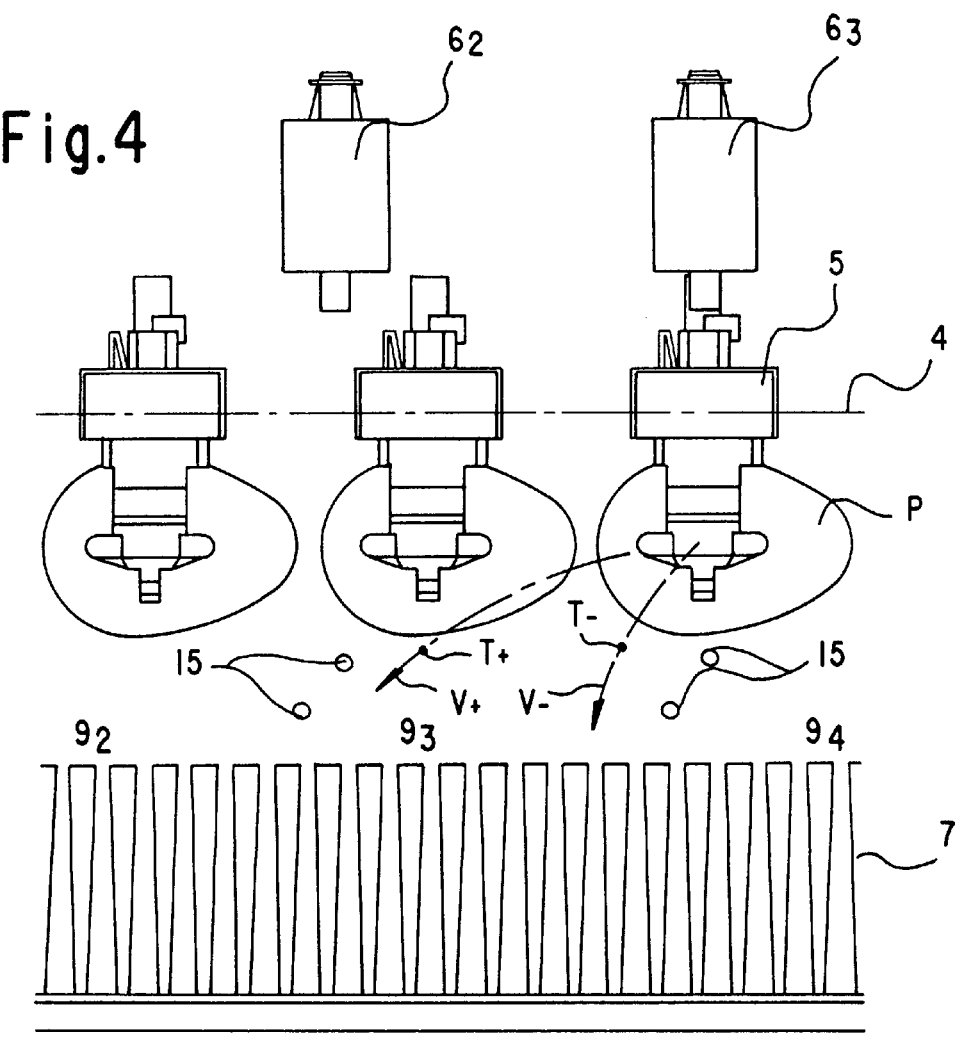
FIG. 4 is a detail of FIG. 3, shown to an enlarged scale.

In the detail shown to an enlarged scale in FIG. 4, two discharge, members $6_2$ and $6_3$ are shown, associated with the channels $9_2$ and $9_3$ of the receiving or brush conveyor 7. Extending under these discharge members is track 4 of the feed conveyor 1, and the discharge members $6_2$ and $6_3$ can, when energized, open an egg carrier 5, whereupon the egg is discharged. The discharge members $6_2$ and $6_3$ are located approximately vertically above the upstream edges of the channels $9_2$ and $9_3$ or above the stretched elastic ropes 15. In FIG. 4, the situation is shown wherein the discharge member $6_3$ is energized and the egg P included in the egg carrier 5 is discharged. Depending on the position of the discharge member $6_3$ relative to the associated channel $9_3$ of the brush belt 7, three situations can occur:

At very low speeds, for instance during the start of the feed conveyor, an egg P discharged by the discharge member $6_3$ falls down vertically, after which this egg, in the absence of the elastic ropes 15, could tilt in the direction of the channel $9_4$ of the brush belt 7. When the speed of the feed conveyor further increases, the landing location of the discharged egg P will shift leftwards and, consequently, the discharged egg will end up in the channel $9_3$ associated with the discharge member $6_3$. When the speed of the feed conveyor 1 increases still further, the landing location of the egg P will shift still further leftwards relative to the discharge point and the egg may end up in the channel $9_2$ of the brush belt 7. Hence, the distribution in landing locations of eggs P discharged by means of the stationary discharge member $6_3$ is considerably greater than the width of a brush channel $9_2$, $9_3$ etc.

To ensure that all eggs P discharged by means of the discharge member $6_3$ end up in the associated brush channel $9_3$, elastic ropes 15 are stretched at a short distance above the top face of the brush belt 7, which ropes provide that the eggs P discharged by the discharge member $6_3$ at low speed receive a little push, causing them to tilt in the direction of the brush channel $9_3$, while the eggs discharged at high speed, whose fall trajectory would end in the brush channel $9_2$, are retained or tilted in the direction of the brush channel $9_3$ by one or more other elastic ropes 15. Through a proper choice of the positioning of the discharge member $6_3$ and of the elastic ropes 15 relative to the edges of the brush channel $9_3$, it is thus realized that all eggs discharged by the discharge member $6_3$ end up in the brush channel $9_3$, independently of the speed of travel at the moment of discharge. Particularly in order to prevent shooting through of eggs P discharged at higher speed, each sidewall of a channel $9_2$, $9_3$ preferably consists of two ropes 15, arranged one obliquely above to other, as shown in FIG. 4.

By way of illustration, FIG. 4 shows two fall trajectories of an egg P, of which the fall trajectory T− is associated with a low speed V− of the feed conveyor 1. The eggs which, during discharging, follow a fall trajectory T− will fall on the pair of ropes 15 shown to the right of that fall trajectory, and will be deflected leftwards thereby. The eggs P discharged at a speed of travel V+ of the feed conveyor 1 and following the fall trajectory T+ will contact the pair of ropes 15 shown to the left in FIG. 4, and will thereby be received and tilted in the direction of the brush channel $9_3$.

Figure 2:
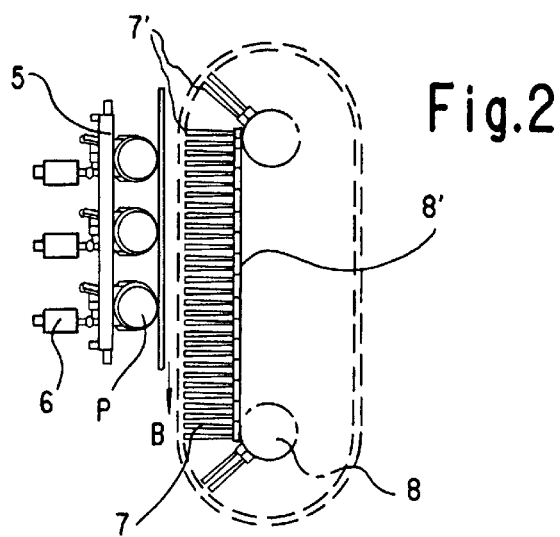
FIG. 2 is a side elevation of the apparatus according to FIG. 1.
Figure 3:
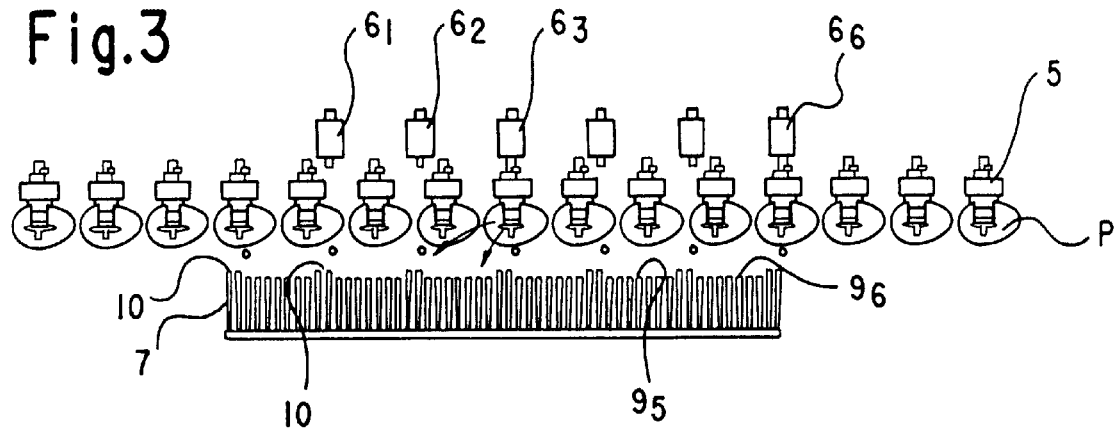
FIG. 3 is a front view of the apparatus according to FIG. 1.
Figure 5:
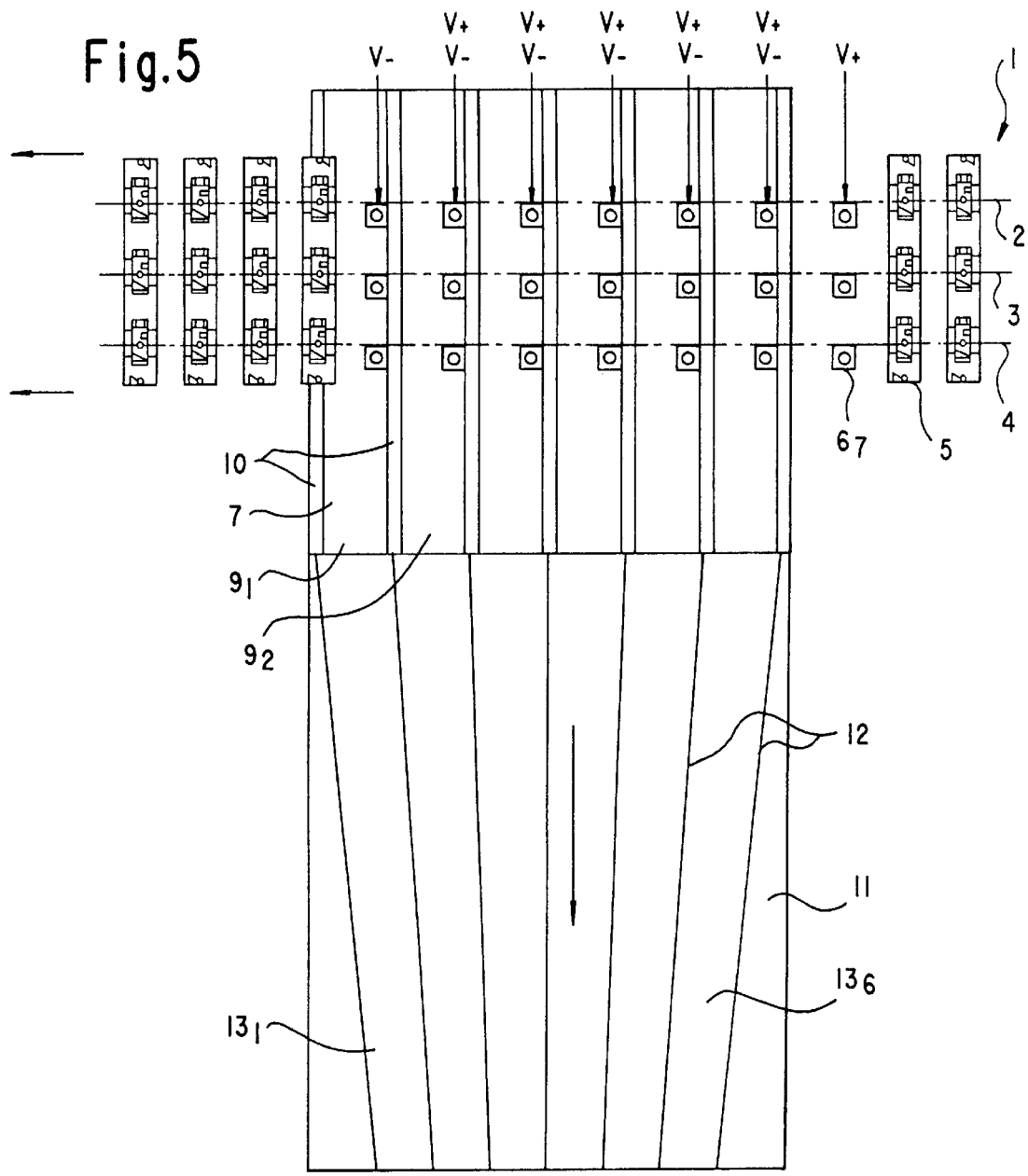
Figure 6:
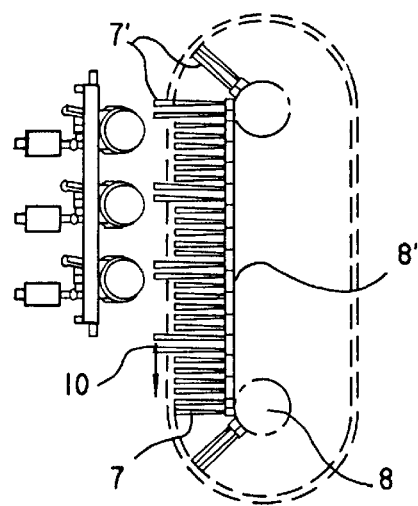

A structural variant shown in FIGS. 5–7 substantially corresponds to the one shown in FIGS. 1–3, the only difference being that the elastic ropes 15 are absent and the series of discharge members $6_1$–$6_6$ is supplemented with a seventh, fixedly disposed discharge member $6_7$. The function thereof is explained with reference to FIG. 8, which again shows two discharge members $6_2$ and $6_3$ associated with the brush channels $9_2$ and $9_3$ respectively. The positioning of the discharge members $6_2$ and $6_3$ relative to the associated brush channels $9_2$ and $9_3$ differs somewhat from the mutual positioning as shown in FIG. 4. Compared with FIG. 4, the discharge members $6_2$ and $6_3$ in FIG. 8 have shifted leftwards through a slight distance.

The structural variant shown in FIG. 8 operates as follows:

The eggs P fed at low speed V− and intended to be discharged into the brush channel $9_2$, are discharged through energization of the discharge member $6_2$ and follow the fall trajectory T−. The discharge of the eggs intended for the brush channel $9_2$ by means of the associated discharge member $6_2$ can take place until the speed of travel V− of the feed conveyor 1 reaches such a level that the eggs discharged at that speed run the risk of tilting over the left edge 10 of the brush channel $9_2$ and ending up in the adjacent brush channel $9_1$. At that speed of travel of the feed conveyor 1, and for higher speeds, the eggs intended for the brush channel $9_2$ are discharged by means of the discharge member $6_3$ associated with the brush channel $9_3$. In FIG. 8, the fall trajectory of eggs P discharged at the high speed V+ of the feed conveyor 1 is indicated by T+. Through a proper positioning of the fixed discharge members $6_2$ and $6_3$, it can be achieved that the eggs which are discharged at a speed of travel up to about 70% of the maximum speed of travel of the feed conveyor 1, are discharged by means of the discharge member $6_2$, while the discharge of eggs P which at the moment of discharge have a speed higher than about 70% of the maximum speed, are discharged by the fixed discharge member $6_3$. It will be understood that this latter discharge member $6_3$ is also energized during the discharge of eggs P intended for the brush channel $9_3$, which eggs P at the moment of discharge have a speed which is 70% or less of the maximum speed of travel of the feed conveyor 1.

Finally, it will be understood that the discharge member $6_7$ shown in FIGS. 5 and 7 is intended for discharging the eggs travelling at high speed V+ into the channel $9_6$ of the brush belt 7. In the above-described variant, the number of fixed discharge members per track 2, 3 and 4 of the feed conveyor 1 is therefore increased by one.

Figure 9:
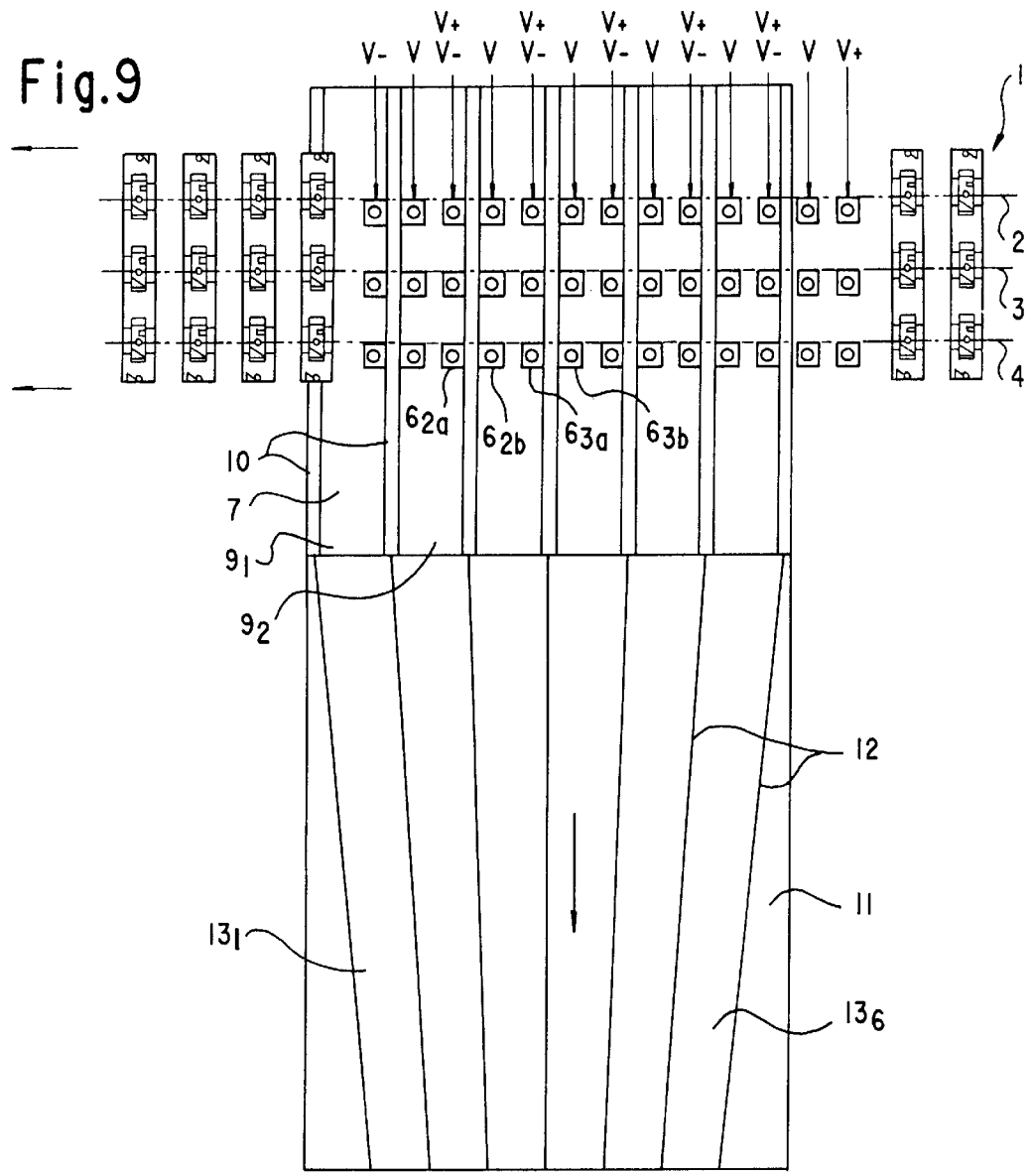
FIGS. 9–11 are views according to FIGS. 1–3 of a third embodiment.
Figure 10:
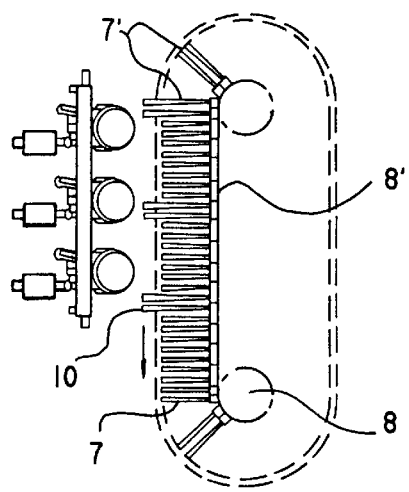
Figure 11:
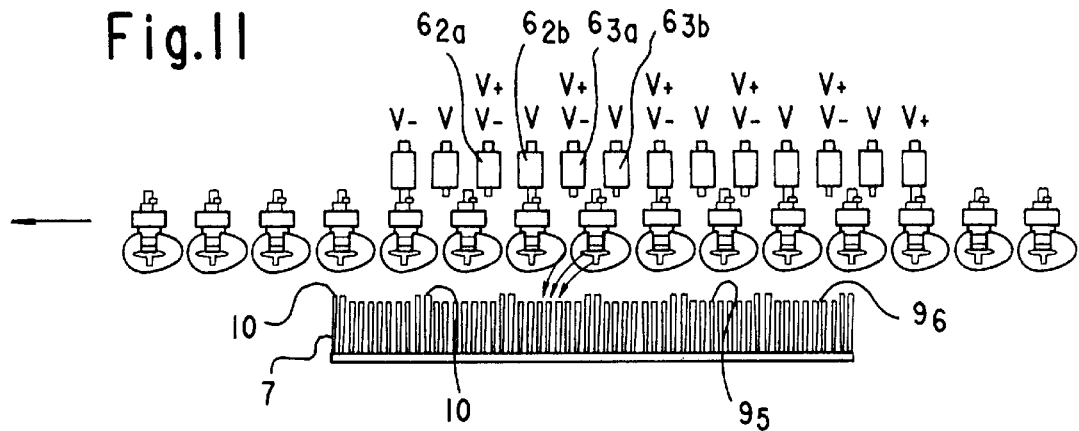

The structural variant shown in FIGS. 9–11 differs from the one shown in FIGS. 5–7 only in that the number of fixed discharge members has been increased. The operation of this structural variant is specified with reference to FIG. 12. In this Figure, two discharge members $6_{2a}$ and $6_{2b}$ are shown, both associated with the brush channel $9_2$. The discharge members $6_{3a}$ and $6_{3b}$ are associated with the brush channel $9_3$. The discharge member $6_{2a}$ is controlled for discharging eggs travelling at a low speed V− at the moment of discharge. These eggs follow the fall trajectory T− and end up on the brush channel $9_2$.

If the speed of travel of the eggs P at the moment of discharge exceeds a first limit value, the eggs P intended for the brush channel $9_2$ are no longer discharged by means of the discharge member $6_{2a}$, but by means of the discharge member $6_{2b}$. The eggs discharged then follow the fall trajectory T.

If the machine speed of the egg-sorting apparatus, and hence the speed of travel of the feed conveyor, is further increased and exceeds a second limit value for the speed, the eggs intended for the brush channel $9_2$ are discharged by means of the dischage member $6_{3a}$ associated with the following brush channel $9_3$. The eggs P discharged then follow the fall trajectory T+. The same discharge member $6_{3a}$ is also controlled for discharging eggs P in the brush channel $9_3$, if the speed of travel of the feed conveyor 1 is in the range between zero and the above-mentioned first limit value for the speed of travel.

As appears from FIG. 9, two discharge members $6_{1a}$, $6_{1b}$ etc. are associated with each brush channel $9_1$, $9_2$ etc., while for each track 2, 3 and 4 of the feed conveyor 1, an extra discharge member has been added.

Figure 12:
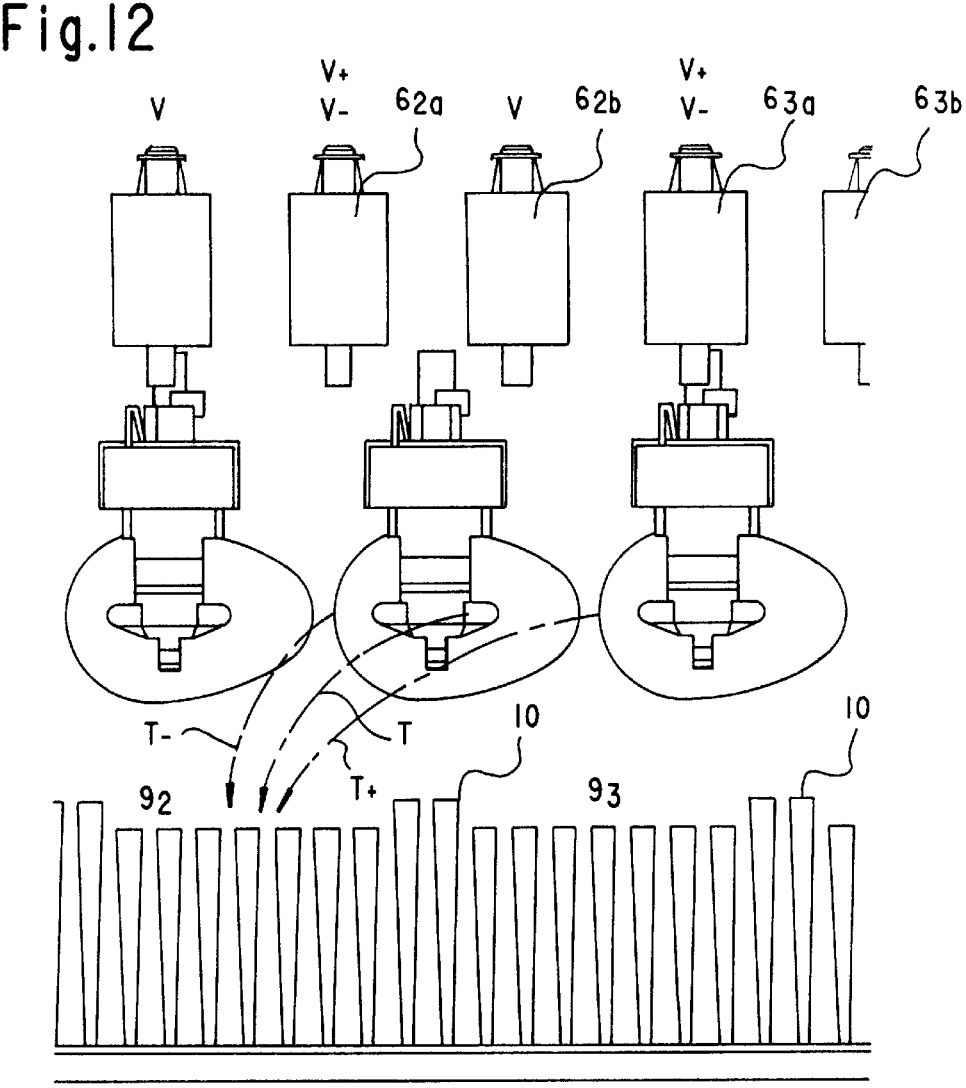
FIG. 12 is a detail of the view according to FIG. 11, shown to an enlarged scale.

By using, in accordance with the structural variant of FIG. 12, three discharge members $6_{2a}$, $6_{2b}$ and $6_{3a}$ per brush channel $9_2$, $9_3$, etc., the lateral distribution of the landing locations in the brush channel $9_2$ is smaller than is the case in the structural variant according to FIG. 8. In the variant according to FIG. 8, the first and the second limit value for the speed of travel of the feed conveyor 1 are equal to each other and, hence, there is no third speed range, which, in the discussion of FIG. 12, is indicated as the speed range V.

The discharge members $6_{2a}$ and $6_{2b}$ shown in FIG. 12 and associated with the brush channel $9_2$ each consist of an electric coil comprising a movable core whose end acts as unlocking pawl for an egg carrier. To limit the number of discharge coils, the coils of the discharge members $6_{2a}$ and $6_{2b}$ can be replaced by one single coil, whose movable core has its bottom side provided with a bar that extends in the direction of movement of the associated track and comprises two unlocking pawls for the respective discharge points associated with the fall trajectories T− and T. Through energization of this coil at different moments, one or the other unlocking pawl can be put into action, depending on the desired fall trajectory T− or T.

I claim:

1. A transfer apparatus for transferring separate products from a feed conveyor to a packaging apparatus, said transfer apparatus comprising:

a feed conveyor having at least one track of product holders, said product holders being spaced apart in a direction of movement of the feed conveyor;

a receiving conveyor having brushes for receiving products discharged from the feed conveyor, said receiving conveyor having a substantially flat top face and arranged under the feed conveyor and having a direction of movement perpendicular to the direction of movement of the feed conveyor;

a feed-through conveyor, connecting to the receiving conveyor, for further conveying the products to a packaging apparatus;

means for influencing fall trajectory of products discharged from the feed conveyor, said means for influencing being arranged above said top face of the receiving conveyor and dividing said top face into a number of parallel channels extending in the direction of movement of the receiving conveyor; and discharge members, fixedly arranged above the feed conveyor, the discharge members and said means for influencing the fall trajectory of discharged products being arranged so that products discharged from the feed conveyor by the same one of said discharge members are received in the same channel on the receiving conveyor independently of speed of travel of said feed conveyer at the moment of discharge.

2. The transfer apparatus according to claim 1 wherein the means for influencing the fall trajectory of products discharged from the feed conveyor comprises elastic ropes stretched above the top face of the receiving conveyor, the number of discharge members of the feed conveyor per track being equal to the number of said channels and each of said channels serving as a landing location for products discharged from the fixed discharge member associated with said channel.

3. A transfer apparatus for transferring separate products from a feed conveyor to a packaging apparatus, said transfer apparatus comprising:

a feed conveyor having at least one track of product holders, said product holders being spaced apart in a direction of movement of the feed conveyor;

a receiving conveyor arranged under the feed conveyor and having a direction of movement perpendicular to the direction of movement of the feed conveyor, and having brushes for receiving products discharged from the feed conveyor, said receiving conveyor having a substantially flat top face divided by extended brush hairs into parallel channels extending in the direction of movement of the receiving conveyor;

a feed-through conveyor, connecting to the receiving conveyor, for further conveying the products to a packaging apparatus; and discharge members, fixedly arranged above the feed conveyor such that at least two fixed discharge members are associated with each of said channels, each of said channels serving as a landing location for products discharged from the at least two fixed discharge members associated therewith, a first fixed discharge member associated with a first channel discharging articles into the first channel at a speed of travel of the feed conveyor below a predetermined first speed, a discharge member associated with an adjacent preceding channel, viewed in the direction of movement of the feed conveyor, discharging articles into said first channel at a speed of travel of the feed conveyor above a predetermined second speed, and a second discharge member associated with said first channel discharging articles into said channel at a speed of travel ranging between the first and the second predetermined speeds.

4. An apparatus for conveying separate products comprising:
- a variable speed feed conveyor having at least one track of product holders, the product holders being spaced apart in a direction of movement of the feed conveyor, said product holders constructed to selectively release separate products;
- a receiving conveyor located beneath the feed conveyor and having a direction of movement substantially perpendicular to the direction of movement of the feed conveyor, the receiving conveyor having a movable product receiving surface which is sufficiently resilient to receive the separate products from the feed conveyor without damage thereto; and
- elongated resilient elements located above the surface of the receiving conveyor and extending parallel to the direction of movement of the receiving conveyor to form channels for released separate products, the elongated resilient elements being spaced apart a sufficient distance such that a separate product, when released at a given point along the direction of movement of the feed conveyor, falls between the same two elongated resilient elements independently of speed of the feed conveyor.

5. The apparatus according to claim 4 wherein said feed conveyor includes discharge members for discharging products from the product holders, a separate discharge member being associated with each of said channels.

* * * * *